UNITED STATES PATENT OFFICE.

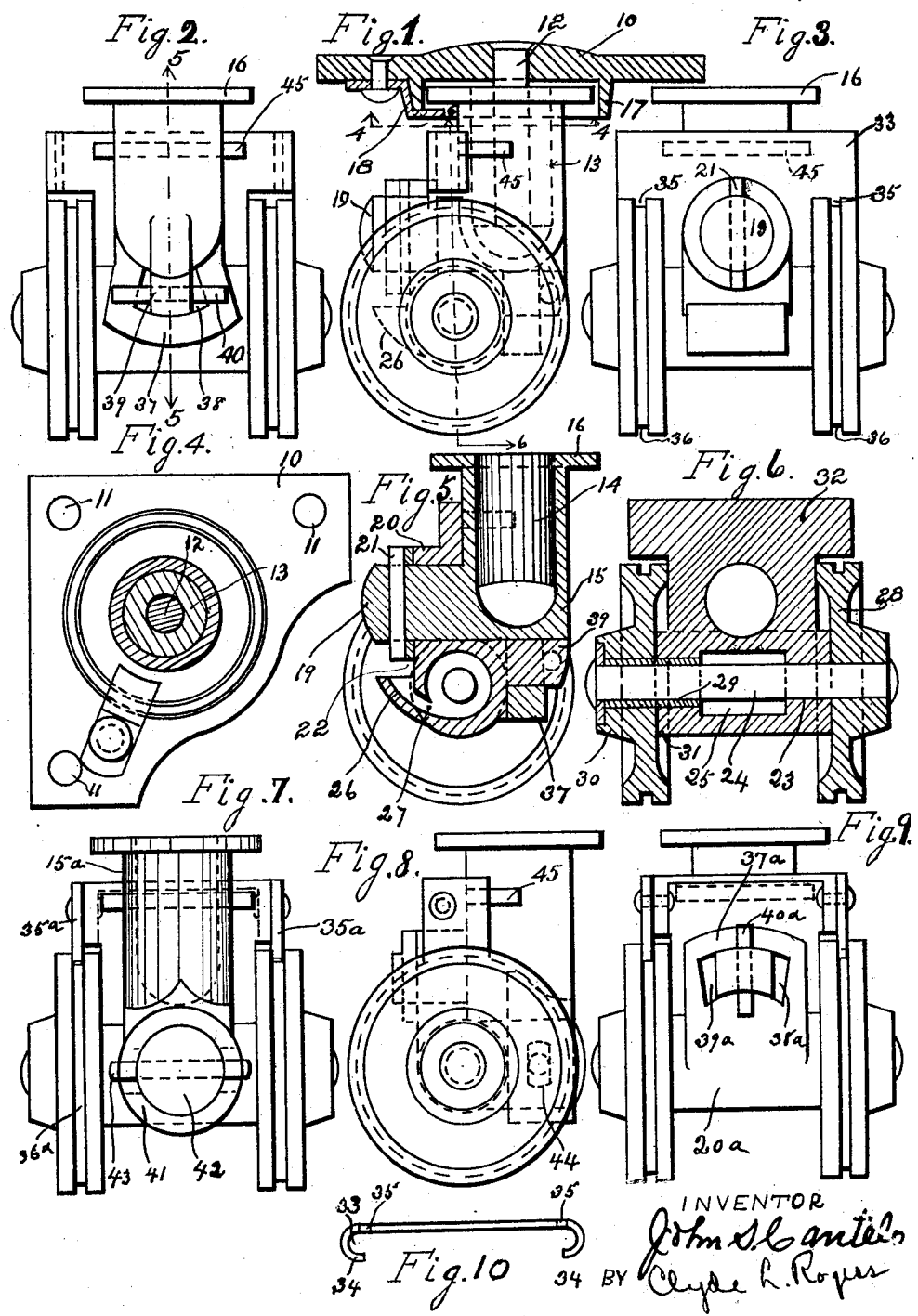

JOHN S. CANTELO, OF BOSTON, MASSACHUSETTS.

CASTER.

1,406,930.   Specification of Letters Patent.   Patented Feb. 14, 1922.

Application filed April 1, 1918. Serial No. 225,955.

*To all whom it may concern:*

Be it known that I, JOHN S. CANTELO, a citizen of the United States, and resident of Boston, county of Suffolk, Commonwealth of Massachusetts, have invented an Improvement in Casters, of which the following description, in connection with the accompanying drawings, is a specification, like characters on the drawings representing like parts in each of the several views.

This invention relates to casters and while having other and more general fields of usefulness is well adapted and designed for use on shoe racks which are employed to transfer shoes through the different departments of a factory in the course of manufacture. One important object of the invention is to provide improved means for preventing the adhering and winding on to the caster wheels of thread and other debris that may be caught up from the floor over which the caster passes. Another object is to provide an improved construction of scraper or clearer element co-operative with the caster wheels that is exceptionally simple in construction and easy to apply. Another object is to provide an improved mounting of spaced apart wheels on a caster base whereby each wheel is simply yet securely mounted and with a capability of turning with respect to the other wheel. A still further object is to simplify and make more substantial the mounting of the caster wheels and construction of the caster generally. A still further object is to provide a construction of caster wheel mounting equipped with improved means for lubrication. A still further object is to provide an improved construction of caster holding cap that is also adapted to serve as a corner brace and reinforced for the base of the shoe rack. The foregoing and other objects and advantages of the invention will more fully appear from the following detailed description, and the distinctive features of novelty will be pointed out in the appended claims.

Referring to the drawings:

Fig. 1 is a side view with the holding cap in section showing one embodiment of my invention;

Fig. 2 is a rear view of my improved caster with the cap removed;

Fig. 3 is a front view thereof;

Fig. 4 is a transverse section looking upward on line 4—4 of Fig. 1;

Fig. 5 is a vertical section on line 5—5 of Fig. 2;

Fig. 6 is a vertical section on line 6—6 of Fig. 1;

Fig. 7 is a rear elevation showing a somewhat modified form of the invention;

Fig. 8 is a side view of the form shown in Fig. 7;

Fig. 9 is a front view thereof; and

Fig. 10 is a bottom plan view of a cleaner or scraper element for use with the form shown in Figs. 1 to 6.

The cap 10 from which the present caster depends is made as a relatively large plate with screw or bolt holes 11 at the corners thereof, and this cap plate is thus adapted to reinforce and brace the corners of the rack base to which it is secured. In this cap a stout stud 12 is riveted and projects downward and has fitted to its lower portion a bearing sleeve 13 which fits into and operates in a cup socket 14 formed in the caster base vertical pivot sleeve 15. The top of this base which is formed as a sleeve with the socket 14, has at its upper end a lateral flange 16, which extends up within a depending shroud flange 17 of the cap 10, a holding clip 18 secured to the cap extending inward to engage said flange 16 and prevent separation of the caster from the cap 10. The base 15 has an axle 19 extending transversely therefrom and to this is fitted a hub frame or axle sleeve 20 which is slipped over said axle and held in place by a cotter pin 21 with an interposed washer 22. The hub frame 20 has its lower portion immediately below the axle 19 equipped with bearings 23 to receive a shaft 24 which constitutes a wheel axle. The intermediate portion of said frame surrounding said shaft is recessed as seen at 25 to constitute a lubrication chamber and the material of the frame is extended at the front to form an oil receiving and retaining lip 26 with a passage 27 therefrom into the recess 25. Thus the recess 25 may be filled with felt or waste and kept supplied with lubricant through the passage 27. The shaft 24 has fixed at one projecting end thereof a wheel 28 which turns with said shaft, while at its other projecting end it has fitted to turn thereon a sleeve 29 to which is fixed a similar wheel 30 at the other side of the caster frame. The inner sides of the wheels 28, 30 are hubless and are recessed to receive bearing projections 31 which extend from the frame somewhat within the sides of said wheels, the purpose of this construction being to prevent the catching up of any loose threads or other debris by a revolving hub, and the protection of the bearing surfaces against the winding in of such threads. The bearing sleeve 29 extends inward to the lubricant recess 25 and thus is adapted to disseminate lubricant therefrom so that the bearings at both sides of the shaft axle are properly oiled. With this construction it will be understood that the wheel 30 on its sleeve 29 turns loose on the shaft axle 24, while said axle and the other wheel turn together, thus making allowance for the varying rates of relative rotations of said wheels in turning corners, etc. The frame 15 is equipped with an upward extension 32 at the front, this presenting a flat top edge extending over each of the wheels. Upon this extension I fit, preferably by frictionally pressing the same thereon, a cleaner or scraper clip 33 consisting in a plate member having its ends bent in around the sides of the extension 32 as seen at 34, and having its lower edge equipped with projections or teeth 35 adapted to extend into peripheral grooves 36 of the respective wheels. These grooves 36 each are of substantial width and depth and are an important feature of the invention since they beak up the peripheral surface of the wheels and greatly reduce the tendency of threads and other like waste to cling to the wheels. By having the teeth or projections 35 extending into these grooves, i. e., within the peripheral surface of the wheel, it is not necessary to have either these teeth or the cleaner member itself in pressing or frictional contact with the surface of the wheel, since any threads caught up would be certain to extend at one or more points across the grooves 36, and thus be caught and cleared off by the teeth 35 even though these do not actually touch the wheel at all. The base 15 is equipped with a depending extension 37 which has a recess 38 formed therein affording clearance for the limited movement therein of a backward projection 39 of the frame 20 which has a cotter pin 40 passed therethrough back of such extension 37 to support the parts and hold them from relative displacement. Thus the frame 20 with the caster wheels is permitted a limited swinging movement determined by the amount of play permitted the projection 39 in the recess 38. In Figs. 7, 8 and 9 I show a form of the invention wherein the caster base 15ª instead of having an axle 19 formed therewith, is equipped with a depending sleeve hub 41 in which is fitted an axle 42 of the wheel frame 20ª, a cotter pin 43 being passed through said axle and operating in slots 44 of said sleeve to prevent displacement of the parts. In this form of the invention the wheel frame 20ª is equipped with an upward projection 37ª with a recess 38ª therein in which is fitted a projection 39ª from the base 15ª, the relative movement thus permitted of said extension 37ª determining the swinging permitted the wheel frame. A cotter pin 40ª is provided to hold the parts from relative displacement. In this form the wheel frame 20ª is equipped with an upward extension 32ª to the sides of which are riveted or bolted cleaner members 35ª which in this case project down into the peripheral recesses 36ª of the wheels but do not otherwise extend over the periphery of the wheels at all, said cleaner members serving in a manner already described to catch and clear off thread or other waste from the wheels as they rotate. In both forms of the invention described I preferably equip the upper socket extension of the base 15 with a forwardly extending flange plate 45 which has a plane front edge serving as a backing and bearing for the top portion of the swinging wheel frame 20.

By having the bearing member of the base 15 integral therewith, i. e., in the form of the integral axle 19, I am enabled to locate the swinging center of the wheel frame 20 farther downward than could be the case with the use of a separate bearing stud or shaft; this is a feature of importance in obtaining stability and strength in the caster mounting. I am aware that the invention may be embodied in other specific forms without departing from the essential attributes of the invention, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A caster, comprising a wheel frame with a wheel journaled thereto, said wheel having a peripheral groove intermediate the width thereof, and thread clearing means carried by said frame to co-operate with said groove.

2. A caster, comprising a wheel frame having a wheel journaled thereto, said wheel having a peripheral groove intermediate the width thereof, and a thread clearer carried by said frame and extending into said groove.

3. A caster, comprising a wheel frame having a wheel journaled thereto, said wheel having a groove of substantial width and depth in its peripheral surface intermediate the sides thereof, and relatively stationary thread clearing means mounted to cooperate with said groove.

4. A caster, comprising a wheel frame having spaced apart wheels journaled thereto, each of said wheels having a groove in the peripheral tread thereof intermediate the sides of the wheel, and a single cleaner member carried by said frame and equipped with teeth extending into grooves of the respective wheels.

5. A caster comprising a wheel frame having a wheel journalled thereto and equipped with a mounting for a cleaner, formed as a plate extending from the wheel frame upwardly, and a cleaner member consisting in a plate with its ends turned to embrace said mounting plate frictionally, said cleaner plate extending laterally of the mounting plate to engage with the wheel periphery.

6. A caster comprising a wheel carrier with wheels journalled at the sides thereof, said carrier equipped with an upright mounting for a cleaner, and a cleaner device in the form of a plate clip with its ends bent to clamp around said upright and be held frictionally thereon, said cleaner device having portions extending laterally at each side of the carrier to engage the wheel periphery.

7. A caster, comprising a wheel frame having spaced apart wheels carried in spaced apart relation thereby, one of said wheels having an axle fixed thereto extending across said frame and through the second wheel, said second wheel having a sleeve journaled in said frame and on said axle to turn free thereof, said frame having a lubricant chamber intermediate said wheels and adapted to oil both thereof, said axle extending through said lubricant chamber and said sleeve extending to said chamber whereby the bearings of both wheels are lubricated.

8. A caster, comprising a wheel frame having spaced apart wheels journaled thereto, said frame having an intermediate lubricant chamber for oiling both of said wheels, with an oil receiving passage extending forwardly and upwardly and terminating in a receiving lip at the front of said frame.

9. A caster, comprising a base with a cap swiveled thereto, said base having an integral horizontal bearing stud extending from the bottom thereof, and a wheel frame with spaced apart wheels journaled thereto swingingly mounted on said stud, said base and said frame having co-operative means for limiting the swinging of said frame with respect to said base.

10. A caster, comprising a base, a wheel frame with spaced apart wheels journaled thereto swingingly mounted on said base, and co-operative means on said frame and base for limiting the swinging of said frame with respect to said base consisting in an apertured extension on one of said members with a projection on the other of said members extending into and operative in said aperture within the limits of clearance thereof.

11. A caster comprising an axle sleeve to which wheels are attached at its two ends by means of a rotating axle passing therethrough as described, in combination with a vertical pivot sleeve having near its lower end a right angle projection therefrom passing over and resting across the upper side of the axle sleeve, said pivot sleeve having at its lower end an oscillating projection bearing stop shoulders and adapted to govern the oscillating motion of the pivot sleeve by co-operation with an integral projection from said axle sleeve engaging said shoulders, whereby said wheels within predetermined limits are self-conforming to unevenness in floors over which they pass.

12. A caster comprising an axle sleeve to which wheels are attached at its two ends by means of a wrought iron rotary axle, said axle reinforcing said sleeve for the purpose of supporting downward pressure thereon, and a vertical pivot sleeve having a pivot stud projecting horizontally at its lower end, said stud journalled in said axle sleeve directly over and transversely of the axle therein.

In testimony whereof, I have signed my name to this specification.

JOHN S. CANTELO.